US006306971B1

(12) United States Patent
Betremieux et al.

(10) Patent No.: US 6,306,971 B1
(45) Date of Patent: *Oct. 23, 2001

(54) COMPOSITIONS BASED ON A FLUORINATED POLYMER COMPRISING VINYLIDENE FLUORIDE UNITS AND ON A BUTADIENE-ACRYLONITRILE ELASTOMER

(75) Inventors: Isabelle Betremieux, Beaumontel; Christian Dousson, Bernay, both of (FR)

(73) Assignee: Atofina, Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,828

(22) Filed: Jan. 20, 1998

(30) Foreign Application Priority Data

Jan. 17, 1997 (FR) .................................................. 97 00478

(51) Int. Cl.$^7$ .............................. C08L 27/04; C08L 9/02
(52) U.S. Cl. ......................... 525/199; 525/104; 525/192; 525/194; 525/197; 525/232; 525/233; 525/239; 525/329.3
(58) Field of Search .................................... 525/199, 192, 525/194, 329.3, 239, 232, 233

(56) References Cited

U.S. PATENT DOCUMENTS 5,095,072 * 3/1992 Kobayashi ............................ 525/199
5,548,028 8/1996 Tabb ...................................... 525/194

FOREIGN PATENT DOCUMENTS 0 714 944   6/1996   (EP) .

OTHER PUBLICATIONS

Whelan, Polymer Technology Dictionary, First Edition, (1994), Chapman & Hall (London).*
Patent Abstracts of Japan, vol. 016, No. 387 (C–0975), Aug. 18, 1992.
Patent Abstracts of Japan, vol. 006, No. 231 (C–135), Nov. 17, 1982.

* cited by examiner

Primary Examiner—Fred Zitomer
(74) Attorney, Agent, or Firm—Millen, White, Zelano & Branigan, P.C.

(57) ABSTRACT

Compositions comprising at least one fluorinated polymer comprising vinylidene fluoride units and at least one nitrile rubber exhibit good mechanical and thermomechanical properties as well as good chemical resistance, in particular good impermeability to hydrocarbons. These compositions are beneficially used in the manufacture of components having at least two layers such as films, pipes, tubes or laminates.

22 Claims, No Drawings

US 6,306,971 B1

COMPOSITIONS BASED ON A FLUORINATED POLYMER COMPRISING VINYLIDENE FLUORIDE UNITS AND ON A BUTADIENE-ACRYLONITRILE ELASTOMER

FIELD OF THE INVENTION

The present invention relates to the field of polymers and more particularly to compositions comprising at least one fluorinated polymer comprising units deriving from vinylidene fluoride (VF2) and at least one nitrile rubber.

BACKGROUND OF THE INVENTION

U.S. Pat. No. 5,095,072 has described thermoplastic blends of PVDF and of rubber of nitrile or acrylate type in the gel form. The gelling of the rubber is obtained by addition of multifunctional monomers or by high-temperature polymerization and not by vulcanization. The gelled rubber is then mixed with the PVDF; it is found that the gelled rubber is distributed crudely and unevenly in the PVDF and that the blends obtained exhibit no tensile, flexural or impact-resistant properties, which generally characterizes heterogeneous mixtures of polymers.

EP 714,944 has provided thermoplastic compositions comprising a poly(vinylidene fluoride) (PVDF) matrix in which are dispersed nodules of essentially non-fluorinated vulcanized rubber which exhibit improved mechanical properties in comparison with the blends described in U.S. Pat. No. 5,095,072. In order to improve the multiaxial impact strength, EP 714,944 recommends the addition of a compatibilizing agent chosen from optionally grafted aliphatic polyesters, optionally imidized poly(methyl methacrylate) (PMMA) or polyolefins grafted with methyl methacrylate. These compatibilizing agents often have mediocre chemical and mechanical properties, which has a harmful influence on the compositions onto which they are introduced.

SUMMARY OF THE INVENTION

The compositions according to the invention simultaneously exhibit good mechanical and thermo-mechanical properties as well as good chemical resistance, in particular good impermeability to hydrocarbons, and do not require a compatibilizing agent. They are characterized in that they comprise a mixture composed of 5 to 95% by weight of at least one thermoplastic fluorinated polymer and of 95 to 5% by weight of at least one nitrile elastomer and in that the overall percentage of acrylonitrile in the nitrile elastomer or elastomers is greater than or equal to 30%.

The compositions according to the invention are generally thermoplastic compositions, that is to say that they can be processed by the technologies used for thermoplastics, such as extrusion or calendering. They can also exhibit, depending on the amount of elastomer(s) employed, an elastomeric nature.

In the present invention, fluorinated polymer denotes polymers possessing at least 50 mol % of $VF_2$ residues. Preference is given to VF2 homopolymers (PVDF) and/or to copolymers comprising units derived from VF2 and from hexafluoropropylene (HFP).

Nitrile elastomer within the meaning of the present invention is understood to mean copolymers of butadiene and of acrylonitrile which are optionally partially or completely hydrogenated. The preferred compositions according to the invention are those which contain at least one nitrile elastomer containing at least 35% by weight of acrylonitrile.

The nitrile elastomer or elastomers may or may not be crosslinked.

The vulcanization systems used are well known to the person skilled in the art and the invention is not limited to one specific type of system. Mention may be made of four types of vulcanization systems:

Sulphur systems composed of sulphur in combination with conventional accelerators, such as metal salts of dithiocarbamates (zinc dimethyl-dithiocarbamate, tellurium dimethyldithiocarbamate, and the like), thiuram disulphides (tetramethylthiuram disulphide and the like), sulphenamides, and the like.

These systems can also contain zinc oxide in combination with stearic acid.

Sulphur-donor systems in which most of the sulphur used for the bridgings originates from sulphur-containing molecules such as the abovementioned organosulphur compounds.

Phenolic resin systems composed of difunctional phenol-formaldehyde resins, which may be halogenated, in combination with accelerators, such as stannous chloride or zinc oxide.

Peroxide systems. They make it possible to have a product which is more stable to heat, and white, not yellow, as in the case of sulphur-donor systems. All free-radical donors can be used (dicumyl peroxide and the like) in combination with zinc oxide and stearic acid.

The nitrile elastomer can be functionalized, for example with carboxylic acid radicals or anhydrides, salts or esters of the said carboxylic acids, with epoxide or amino groups and/or with halogens. The above rubbers which are not functionalized can be functionalized, for example by grafting with radicals in a known way or by mixing with already functionalized elastomers, such as acrylic elastomers or carboxylated NBRs (X-NBRs).

It is also possible to add already vulcanized rubber (for example by recycling milled material). It would not be departing from the scope of the invention to use an elastomer mixture containing a small proporion of fluorinated rubbers, for example up to 5% by weight of the amount of nitrile elastomer.

The compositions according to the invention can be modified for certain specific properties (improvement in the mechanical properties, for example) by the addition of fillers, such as carbon black, silica, kaolin, clay, talc, chalk, and the like. These fillers can be surface treated with silanes, polyethylene glycols or any other coupling molecule. The level by weight of fillers is generally between 5 and 100 per 100 parts of elastomer.

In addition, the compositions can be rendered flexible by plasticizers, such as mineral oils derived from oil, esters of phthalic acid or of sebacic acid, liquid polymer plasticizers, such as optionally carboxylated low-mass polybutadiene, and other plasticizers well known to the person skilled in the nature.

It is generally the nitrile elastomers employed which are formulated, that is to say which have added to them inorganic fillers, plasticizer and optionally a crosslinking system (sulphur or peroxide-based system).

The invention also relates to a process for the preparation of these compositions.

The compositions of the invention can be prepared by mixing:

(i) the nitrile elastomer(s), which has or have optionally been formulated beforehand with a sufficient amount of crosslinking agent, with fillers and with plasticizers, (ii) with the fluorinated polymer(s) at a temperature sufficient to cause the fluorinated polymer(s) to melt and for a period of time sufficient for the nitrile elastomer(s) to be intimately mixed with the fluorinated polymer(s).

When the nitrile elastomer or elastomers are crosslinked, it is preferable to carry out the dynamic vulcanization at a temperature greater than the melting temperature of the thermoplastics and less than 300° C. or better still 250° C., so as to prevent degradation of the elastomers and other additives in the formulation. The duration of the dynamic vulcanization will preferably be sufficient to reach at least the $t_{90}$ of the formulation (time taken to achieve 90% vulcanization of the elastomer or elastomers).

The equipment used to carry out this operation can be a kneader or cokneader, an internal mixer or alternatively a twin-screw extruder.

It is also possible to introduce the fluorinated polymer or polymers, the elastomer or elastomers and the premixed additives together in the plastic state onto a roller or into a mixer, the optional vulcanization system being introduced at the same time (or later when the thermoplastics are in the molten state), and then to increase the temperature to a temperature greater than the melting temperature of the thermoplastics, in order to carry out the dynamic vulcanization.

The vulcanization agent combinations are such that they must make it possible for the elastomer or elastomers to be crosslinked.

The mixing time in order to prepare the compositions of the invention can be between 2 and 20 minutes and advantageously between 2 and 10 minutes.

The compositions of the invention exist in the form of a matrix of fluorinated polymer(s) containing nodules of nitrile elastomer(s), when the amount of nitrile elastomer(s) is less than 70% by weight of the overall composition, and in the form of a matrix made of nitrile elastomer(s) containing nodules of fluorinated polymer(s), when the amount of nitrile elastomer(s) is greater than 70% by weight of the overall composition.

When the amount of nitrile elastomer(s) is less than 70% by weight, the compositions of the invention are thermoplastic; they remain stable during subsequent processing and neither migration nor coalescence of nodules is observed during these processing stages. When the amount of nitrile elastomer(s) is greater than 70% by weight of the overall composition, the compositions of the invention exhibit elastomeric behaviour. In the region of this value, the compositions can simultaneously exhibit thermoplastic behaviour and elastomeric behaviour; in this case, they come within the group thermoplastic elastomers (TPE).

The compositions of the invention exhibit a tensile strength at break of greater than 12 MPa and an elongation at break of greater than 200%, these being measured according to ISO Standard 527 with 5A-type test specimens.

The compositions of the invention also exhibit a very good tear strength, i.e. greater than 50 N/mm, measured according to ASTM Standard D624 on C-type test specimens (drawing rate 200 mm/min).

In addition, the compositions according to the invention exhibit an increased impermeability to hydrocarbons in comparison with compositions based on the same nitrile elastomers but not containing fluorinated polymer.

The present invention also relates to the items manufactured with these compositions and in particular to composite materials.

In particular, the compositions according to the invention are particularly useful for the preparation of multilayer materials, such as pipes, films, tubes or laminates, in which at least one layer comprises one of the compositions according to the invention.

These multilayer materials can be manufactured by coextrusion and/or by making use of coating techniques.

EXAMPLES

Except when otherwise indicated, the proportions shown are expressed by weight. The Mooney viscosity of the elastomers is measured according to ASTM Standard D1646. The melt index (MI) of the thermoplastic resins is measured according to ASTM Standard D1238.

The NBR nitrile rubbers are butadieneacrylonitrile copolymers
- containing 45% by weight of acrylonitrile and with a Mooney viscosity of 60 for Chemigum® N206, sold by Goodyear,
- containing 45% by weight of acrylonitrile and with a Mooney viscosity of 50 for Perbunan®4550, sold by Bayer,
- containing 28% by weight of acrylonitrile and with a Mooney viscosity of 50 for Perbunan®2807 NS, sold by Bayer.

The fluorinated polymer TP1 is a vinylidene fluoride homopolymer with an MI of between 20 and 35 g/10 min, measured at 232° C. under a load of 3.8 kg.

The fluorinated polymer TP2 is a copolymer of vinylidene fluoride and of 3 to 4 mol% of hexafluoropropylene with an MI of between 7 and 25 g/10 min, measured at 232° C. under a load of 3.8 kg.

EXAMPLES 1 to 4

The NBR was formulated in a roll mill at temperatures not exceeding 60° C. according to the following compositions comprising:

|  |  | NBR1 | NBR2 | NBR3 | NBR4 |
|---|---|---|---|---|---|
| NBR | Perbunan ® 4550 |  | 30 | 50 | 100 |
|  | Perbunan ® 2807 NS | 100 | 70 | 50 |  |
| Filler, silica | Ultrasil ® VN3 | 30 | 30 | 30 | 30 |
| Coupling agent | Polyvest ® C70 | 4 | 4 | 4 | 4 |
|  | Si69 | 1 | 1 | 1 | 1 |
| Pigment | TiO$_2$ | 5 | 5 | 5 | 5 |
| Heat stabilizer, diphenylamine | Naugard ® 445 | 1 | 1 | 1 | 1 |
| Accelerator, sulphenamide | MBS | 2 | 2 | 2 | 2 |
| Vulcanization agent | Sulphur | 0.8 | 0.8 | 0.8 | 0.8 |
| Activator, dithiomorpholine | DTDM | 1.5 | 1.5 | 1.5 | 1.5 |
| Retarder, thiophthalimide | Santogard ® PVI 50 | 4 | 4 | 4 | 4 |
| Zinc oxide | ZnO | 5 | 5 | 5 | 5 |
| Stearic acid |  | 1 | 1 | 1 | 1 |
| Total |  | 155.3 | 155.3 | 155.3 | 155.3 |

These formulations were then mixed with the TP1 and dynamically vulcanized in a Plasti Corder® Brabender for approximately 5 min at temperatures of between 170 and 220° C.

The various compositions were then moulded by compression at 200° C. in the form of sheets, from which test specimens were cut out in order to measure the following mechanical properties:

elongation at break and breaking stress, measured according to ISO Standard 527 on 5A-type test specimens (drawing rate 200 mm/min).

The results are combined in Table 1.

TABLE 1

| Examples | 1 | 2 | 3 | 4 |
|---|---|---|---|---|
| Composition (%) | | | | |
| NBR1 | 45 | | | |
| NBR2 | | 45 | | |
| NBR3 | | | 45 | |
| NBR4 | | | | 45 |
| TP1 | 55 | 55 | 55 | 55 |
| Breaking stress (MPa) | 14.8 | 17.8 | 19.7 | 25.0 |
| Elongation at break (%) | 115 | 242 | 342 | 310 | dynamically vulcanized in an extruder or in an internal mixer at temperatures of greater than 180° C.

The various compositions were then moulded by compression at 200° C. in the form of sheets, from which test specimens were cut out in order to measure the following mechanical properties:

elongation at break and breaking stress, measured according to ISO Standard 527 on 5A-type test specimens (drawing rate 200 mm/min)

tear strength, measured according to ASTM Standard D624 on C-type test specimens (drawing rate 200 mm/min)

Shore D hardness, measured within 5 s according to ASTM Standard D 2240

CS, measured after 22 h at 70° C. according to ASTM Standard D395 (method B).

The results are combined in Table 2.

TABLE 2

| Examples | 5 | 6 | 7 | 8 | 9 | 10 | 11 | 12 | 13 |
|---|---|---|---|---|---|---|---|---|---|
| Composition (%) | | | | | | | | | |
| NBR5 | 70 | 50 | 40 | 60 | 62 | 50 | 60 | 60 | 50 |
| TP1 | 30 | 50 | 60 | 40 | 38 | 25 | 20 | | |
| TP2 | | | | | | 25 | 20 | 40 | 50 |
| Breaking stress (MPa) | 14.1 | 17.8 | 19.9 | 17.4 | 16.7 | 20.4 | 18.5 | 18.4 | 20.1 |
| Elongation at break (%) | 232 | 238 | 195 | 275 | 272 | 375 | 327 | 346 | 439 |
| Tear strength (N/mm) | 52.2 | 85.1 | 103.7 | 67.2 | 69.0 | 72.7 | 63.3 | 55.3 | 67 |
| Shore D hardness | 34 | 42 | 48 | 39 | 38 | 38 | 38 | 31 | 33 |
| CS | 38.5 | 62.0 | 70.5 | 51.5 | 50.0 | 55.5 | 43.8 | 40.3 | 48.5 |

EXAMPLES 5 to 13

The NBR was formulated in a fast mixer at temperatures in the region of room temperature not exceeding 30° C., according to the following composition in parts:

| NBR | Chemigum ® P206* | 115 |
|---|---|---|
| Filler, silica | Ultrasil ® VN3 | 15 |
| Filler, kaolin | Kaolin 94MK01 | 20 |
| Coupling agent | PEG 4000 | 4 |
| Pigment | TiO$_2$ | 5 |
| Coupling agent | Si69 | 1 |
| Stabilizer, phenol | Wingstay ® L | 1 |
| Stabilizer, phosphite | TNPP | 1 |
| Vulcanization agent | Sulphur | 0.8 |
| Accelerator, sulphenamide | MBS | 2 |
| Accelerator, thiuram | TMTD | 0.5 |
| Activator, dithiomorpholine | DTDM | 1.5 |
| Retarder, thiophthalimide | Santogard ® PVI 50 | 4 |
| Stearic acid | | 1 |
| Vulcanization activator | ZnO | 5 |
| Total | | 176.8 |

Chemigum ® P206* = Chemigum ® N206 + anticlotting agent (ground and formulated)

This formulation (NBR5), which exists in the form of a powder with a size of a few hundreds of a μm, was mixed with various fluorinated polymers in various proportions and

EXAMPLES 14 to 18

The NBR was formulated in a roll mill at temperatures not exceeding 60° C. according to the following compositions comprising:

| | | NBR6 | NBR7 | NBR8 | NBR9 | NBR10 |
|---|---|---|---|---|---|---|
| NBR | Perbunan ® 4550 | 100 | 100 | 100 | 100 | 100 |
| Filler, silica | Ultrasil ® VN3 | 30 | | | | |
| kaolin | Polestar ® 200R | | 50 | | | |
| CaCO$_3$ | Polcarb ® SB | | | 50 | | |
| Mg(OH)$_2$ | Magnifin ® 10HT | | | | 50 | |
| | Black FEF 550 | | | | | 50 |
| Coupling | PEG 4000 | | 4 | 4 | 4 | 4 |
| | Polyvest C70 | 4 | | | | |
| | Si69 | 1 | | | | |
| Pigment | TiO$_2$ | 5 | | | | |
| Heat stabilizer, diphenylamine | Naugard ® 445 | 1 | 1 | 1 | 1 | 1 |

-continued

|  |  | NBR6 | NBR7 | NBR8 | NBR9 | NBR10 |
|---|---|---|---|---|---|---|
| Accelerator, sulphenamide | MBS | 2 | 2 | 2 | 2 | 2 |
| Vulcanization | Sulphur | 0.8 | 0.8 | 0.8 | 0.8 | 0.8 |
| Activator, dithiomorpholine | DTDM | 1.5 | 1.5 | 1.5 | 1.5 | 1.5 |
| Accelerator, thiuram | TMTD |  | 0.5 | 0.5 | 0.5 | 0.5 |
| Retarder, thiophthalimide | Santogard ® PVI 50 | 4 | 4 | 4 | 4 | 4 |
| Zinc oxide | ZnO | 5 | 5 | 5 | 5 | 5 |
| Stearic acid |  | 1 | 1 | 1 | 1 | 1 |
| Total |  | 155.3 | 169.8 | 169.8 | 169.8 | 169.8 |

These formulations were then mixed with the TP1 and dynamically vulcanized in a Plasti Corder® Brabender for approximately 5 min at temperatures of between 170 and 220° C.

The breaking stress and the tear strength are measured according to the methods used for Examples 1 to 10.

The results are combined in Table 3.

TABLE 3

| Examples | 14 | 15 | 16 | 17 | 18 |
|---|---|---|---|---|---|
| Composition (%) |  |  |  |  |  |
| NBR6 | 45 |  |  |  |  |
| NBR7 |  | 45 |  |  |  |
| NBR8 |  |  | 45 |  |  |
| NBR9 |  |  |  | 45 |  |
| NBR10 |  |  |  |  | 45 |
| TP1 | 55 | 55 | 55 | 55 | 55 |
| Breaking stress (MPa) | 23.0 | 17.0 | 18.5 | 18.7 | 24.5 |
| Tear strength (N/mm) | 97.5 | 94.0 | 94.0 | 96.0 | 102.0 |

EXAMPLES 19 to 22

Various levels of TP1 were mixed with NBR Chemigum P206 in a Plasti Corder® Brabender mixer at 200° C. for approximately 5 min. The mixtures were then taken over rollers in order to introduce the crosslinking system (Perkadox® BC40) and vulcanized in the form of films with a thickness of approximately 250 µm by compression moulding at 170° C.

From these films, measurements of permeability to the fuel TF1, composed by volume of 10% ethanol and 90% petrol C (mixture of equal volumes of toluene and isooctane), were made according to the procedure detailed below:
- a precise volume (30 ml) of petrol TF1 is placed in a measurement crucible with a diameter of 50 mm and a height of 25 mm
- the crucible is closed off using the film to be tested,
- the assembly is placed in an extracted fume cupboard with a controlled temperature (20° C.) and relative humidity (50%), the crucible being inverted so that the film is in contact with the petrol,
- the crucible is weighed at regular time intervals.

The increase in the variation in the mass as a function of time makes it possible to determine the flow, which is expressed in $g/m^2/24$ h, for an accurately known film thickness.

The results are combined in Table 4.

TABLE 4

| Example | Control | 19 | 20 | 21 | 22 |
|---|---|---|---|---|---|
| Composition (%) |  |  |  |  |  |
| NBR | 100 | 90 | 80 | 70 | 60 |
| TPI | 0 | 10 | 20 | 30 | 40 |
| Thickness of the film (µm) | 262 | 263 | 233 | 272 | 233 |
| TF1 flow ($f/m^2/24$ h) | 2227 | 1692 | 1129 | 593 | 341 |
| TF1 flow ($g/250\ \mu m/m^2/24$ h) | 2334 | 1780 | 1053 | 646 | 386 |

The preceding examples can be repeated with similar success by substituting the generically or specifically described reactants and/or operating conditions of this invention for those used in the preceding examples.

For a further discussion of the abbreviations NBR and XNBR as well as a discussion of acrylic elastomers (rubbers) (ACM), reference is made to Ullman's Encyclopedia of Industrial Chemistry, 5th edition, Vol. A23, pages 242, 243, 255, 257, 258, 263, and 264.

The entire disclosure of all applications, patents and publications, cited above, and of corresponding French application 94/00478, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition comprising a mixture composed of (a) 5 to 95% by weight of at least one thermoplastic fluorinated polymer containing at least 50 mol percent of vinylidene difluoride ($VF_2$) units and of (b) 95 to 5% by weight of at least one nitrile copolymeric butadiene/acrylonitrile elastomer, optionally hydrogenated, said nitrile elastomer being crosslinked in final form and in that the overall percentage by weight of acrylonitrile in the nitrile elastomer or elastomers is greater than or equal to 30%, said composition having been made by a process comprising providing a mixture comprising said nitrile elastomer in uncrosslinked form, crosslinking agent, and said thermoplastic fluorinated polymer, and heating the mixture at a temperature sufficient to cause the fluorinated polymer to melt and for a period of time sufficient for the nitrile elastomer to be intimately mixed with the fluorinated polymer and to be dynamically crosslinked, said crosslinking agent being a sulfur system, a sulfur-donor system, a phenolic system, or a peroxide system.

2. A composition according to claim 1, containing at least one nitrile elastomer containing at least 35% by weight of acrylonitrile.

3. A composition according to claim 1, wherein the at least one fluorinated polymer comprises at least one of a VF2 homopolymer and a copolymer comprising units derived from VF2 and from hexafluoropropylene (HFP).

4. A composition according to claim 1, containing at least one of a modifier, a filler, and a plasticizer.

5. A thermoplastic compositions according to claim 1 in the form of a matrix of fluorinated polymer(s) containing nodules of nitrile elastomer(s), and in that the amount of nitrile elastomer(s) is less than 70% by weight of the overall composition.

6. An elastomer compositions according to claim 1 in the form of a matrix made of nitrile elastomer(s) containing nodules of fluorinated polymer(s), when the amount of nitrile elastomer(s) is greater than 70% by weight of the overall composition.

7. A process for the preparation of a composition according to claim 1, in which
  (i) the at least one nitrile elastomer(s), which has optionally been formulated beforehand with a crosslinking amount of crosslinking agent, with a filler and with a plasticizer, is mixed
  (ii) with the at least one fluorinated polymer at a temperature sufficient to cause the fluorinated polymer to melt and for a period of time sufficient for the nitrile elastomer to be intimately mixed with the fluorinated polymer.

8. A multilayer article of manufacture in which at least one layer comprises a composition according to claim 1.

9. A product according to claim 8 in the form of a tube, pipe, film or laminate.

10. A composition according to claim 1, wherein the at least one thermoplastic fluorinated polymer is a vinylidene fluoride homopolymer.

11. A composition according to claim 1, wherein said nitrile elastomer is a copolymer of 55% butadiene and 45% acrylonitrile.

12. A composition according to claim 10, wherein said nitrile elastomer is a copolymer of 55% butadiene and 45% acrylonitrile.

13. A composition according to claim 11, said copolymer of butadiene and acrylonitrile being cross-linked by sulfur vulcanization.

14. A composition according to claim 12, said copolymer of butadiene and acrylonitrile being crosslinked by sulfur vulcanization.

15. A composition according to claim 14, wherein based on 100 parts by weight of the butadiene acrylonitrile copolymer, said composition further includes the following additives admixed with said copolymer: 50 parts of carbon black, 4 parts of polyethylene glycol, 1 part of diphenylamine, 2 parts of sulphenamides, 0.8 parts of sulfur, 1.5 parts of dithiomorpholine, 0.5 parts thiuram, 4 parts thiophthalimide, 5 parts zinc oxide and 1 part stearic acid.

16. A composition according to claim 15, wherein the vinylidene fluoride homopolymer is present in a concentration of 55% by weight and the butadiene acrylonitrile copolymer with the additives is present in a concentration of 45% by weight.

17. A composition according to claim 1, being essentially free of a compatabilizing agent.

18. A composition according to claim 1, wherein the uncrosslinked nitrile rubber and the crosslinking agent are mixed at a temperature less than 60° C. to form a precursor mixture prior to the heating of said precursor mixture with the fluorinated polymer.

19. A composition according to claim 1, wherein the heating is conducted to less than 300° C.

20. A composition according to claim 1, wherein the heating is conducted to 170-220° C.

21. A composition according to claim 18, wherein the heating is conducted to 170-220° C.

22. A composition according to claim 1, wherein the nitrile elastomer is non-functionalized.

\* \* \* \* \*